(12) United States Patent
Le

(10) Patent No.: US 8,878,444 B2
(45) Date of Patent: Nov. 4, 2014

(54) CONTROLLER, A DRIVER CIRCUIT AND A METHOD FOR CONTROLLING A DIMMABLE LED LIGHTING CIRCUIT, AND A DIMMABLE LED LIGHTING CIRCUIT

(71) Applicant: NXP B. V., Eindhoven (NL)

(72) Inventor: Nguyen Trieu Luan Le, Cormelles le Royal (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/160,753

(22) Filed: Jan. 22, 2014

(65) Prior Publication Data
US 2014/0203715 A1   Jul. 24, 2014

(30) Foreign Application Priority Data

Jan. 23, 2013   (EP) .................................... 13290017

(51) Int. Cl.
*H05B 33/08* (2006.01)
*H05B 37/02* (2006.01)

(52) U.S. Cl.
CPC ........ *H05B 33/0845* (2013.01); *H05B 33/0815* (2013.01); *H05B 33/0824* (2013.01); *H05B 37/0263* (2013.01)
USPC ..................................................... 315/185 R

(58) Field of Classification Search
USPC ............. 315/291, 307, 246, 247, 209 R, 192, 315/200 R, 185 R
See application file for complete search history.

(56) References Cited

U.S. PATENT DOCUMENTS

| 7,420,335 B2 * | 9/2008 | Robinson et al. .............. 315/224 |
| 7,439,945 B1 * | 10/2008 | Awalt et al. ..................... 345/83 |
| 8,253,352 B2 * | 8/2012 | Liu ............................... 315/307 |
| 2007/0182347 A1 | 8/2007 | Shteynberg et al. |
| 2009/0167203 A1 | 7/2009 | Dahlman et al. |
| 2012/0049752 A1 | 3/2012 | King et al. |

FOREIGN PATENT DOCUMENTS

| EP | 2 330 869 A1 | 6/2011 |
| EP | 2 536 252 A1 | 12/2012 |
| WO | 2011/137646 A1 | 11/2011 |

OTHER PUBLICATIONS

Extended European Search Report for Application 13290017.6 (May 7, 2013).

* cited by examiner

*Primary Examiner* — Minh D A

(57) ABSTRACT

A controller for a dimmable LED lighting circuit is disclosed, the controller comprising: an LED current controller configured to set a current of a constant current source in dependence on a conduction angle of the phase-cut dimmer; a first feedback circuit configured to control the circuit's power converter in dependence on the constant current source by adjusting an output of the power converter; and a second feedback circuit configured to control a supplementary output load arranged in parallel with the series arrangement of the constant current source and plurality of LEDs, wherein the second feedback circuit is operable to adjust the supplementary output load faster than the first feedback circuit adjusts the output of the power convertor.
A driver and lighting circuit also disclosed, as is a method for controlling a dimmable lighting circuit.

10 Claims, 5 Drawing Sheets

CONTROLLER, A DRIVER CIRCUIT AND A METHOD FOR CONTROLLING A DIMMABLE LED LIGHTING CIRCUIT, AND A DIMMABLE LED LIGHTING CIRCUIT

CROSS-REFERENCE TO RELATED APPLICATIONS

This application claims the priority under 35 U.S.C. §119 of European patent application no. 13290017.6, filed on Jan. 23, 2013, the contents of which are incorporated by reference herein.

FIELD OF THE INVENTION

This invention relates to controllers for controlling dimmable LED lighting circuits. It further relates to drivers comprising such controllers, to dimmable LED lighting circuits, and to methods of controlling dimmable LED lighting circuits.

BACKGROUND OF THE INVENTION

Dimmable lighting circuits typically include a phase-cut dimmer, in which either the leading edge or the trailing edge of an alternating current (AC) input supply is cut, usually by means of a thyristor or a triac. For conventional incandescence lighting systems, the optical output of the light-bulb responds only slowly to changes in the electrical input, since the output is determined by the temperature of the filaments and thus changes as the filaments cools. Apart from extremely low dimming levels (that is to say when the current is supplied from the thyristor or triac for only a very small part of the AC half cycle, which typically operates at 50 Hz or 60 Hz), the filament does not cool appreciably during the phase-cut part of the cycle, and thus a user is not aware of the phase cutting.

A preferred configuration of LED lighting circuits, to provide good current control even at very low dimming levels, comprises a constant current source in series with the LEDs. The current provided by the current source is controlled in dependence on the position of the phase cut dimmer. A power converter is used which, together with a capacitor on the output, smoothes the power to the LEDs in order to provide power even during the "cut" part of the AC phase. It will be appreciated that the current source need be "constant" with over timescales of interest. In particular very high frequency fluctuations, of the order of microseconds or milliseconds, may not be of relevance, provided that such fluctuations do not results in drift or fluctuations over longer timescales such as tens of milliseconds.

In contrast to incandescent lighting systems, the optical output of the LED light sources in LED lighting systems changes very quickly with changes to the electrical input. The optical flux output of an LED changes within microseconds of a change in the electrical current. Thus any instabilities or perturbations in the electrical current through an LED are reflected in its optical output. The optical response of a user is not fast enough to be aware of changes occurring at speeds of microseconds, and so if instabilities of perturbations can be corrected sufficiently quickly, they will not be visible. However, fluctuations lasting several tens, or hundreds of milliseconds or longer may become visible. It would be desirable to reduce or even eliminate such slow fluctuations.

SUMMARY OF THE INVENTION

According to a first aspect there is provided a controller for a dimmable LED lighting circuit operable with a phase-cut dimmer and having a power converter for providing power to a series arrangement of a plurality of LEDs and controllable constant current source, the controllable constant current source being for providing a current through the plurality of LEDs, the controller comprising: an LED current controller configured to set the current of the constant current source in dependence on a conduction angle of the phase-cut dimmer; a first feedback circuit configured to control the power converter in dependence on the constant current source by adjusting an output power of the power converter; and a second feedback circuit configured to control a supplementary output load arranged in parallel with the series arrangement of the constant current source and plurality of LEDs.

The supplementary output load may absorb transient variation of the power, which transient variation arises due to relatively slow reaction of the first feedback circuit. Further, the second feedback loop may provide finer resolution control, compared with that controlling the power converter; at very low power levels, corresponding to deep dimming, it may be possible to reduce or eliminate visible flicker associated with the coarse resolution of the power controller feedback circuit. In embodiments, control of the output power of the power converter is by means of controlling the output current; there is a change in output voltage as a consequence of the change in the output current In embodiments the second feedback circuit is configured to adjust the supplementary output load with a time constant which is shorter than a time constant of the first feedback circuit. Provided that the time constant, or response time, of the second feedback loop is similar to, or shorter than, the time constant, or response time, of the first feedback loop, an appreciable improvement in the settling of the overall system after a disturbance may be achieved. However, it will be appreciated that the time constant of the second feedback circuit may be significantly longer than the time constant of the first feedback loop, since, even then the second feedback loop may provide finer resolution on the control of the current through the LEDs, which may be particularly significant at deep dimming levels, as will be discussed further hereinbelow. The overall system may be expected not to encounter problems of instability, provided that the time constant of the second feedback loop is longer than that of mains supply period. As an example, for a mains frequency of 50 Hz, the mains time constant may then be 1/(2×50 Hz), that is 10 ms. Even if the second feedback circuit does not operate faster than the first feedback loop, the increased responsibility to fluctuations, and, or in the alternative, possibly finer resolution, may still result in a reduction or elimination of visible flicker.

In embodiments the first feedback circuit has an input, the input being in communication, in use, with a node between the constant current source and the plurality of LEDs. In embodiments the second feedback circuit has an input, the input being in communication, in use, with a node between the constant current source and the plurality of LEDs.

The controller may be configured for use with a supplementary output load which comprises a controllable resistance. In embodiments the second feedback circuit is configured to set the controllable resistance, in a steady state, to a value which varies in proportion to the secant of the conduction angle of the phase-cut dimmer, over at least 170° of conduction angle.

In other embodiments, the controller is configured for use with a supplementary output load which comprises a controllable current source.

According to the second aspect of there is provided a driver for a dimmable LED lighting circuit comprising a controller as described above, a constant current source for providing a current through the plurality of LEDs, a power converter in communication with and for being controlled by the first feedback circuit, and a supplementary output load in communication with and for being controlled by the second feedback circuit.

According to a further aspect has provided a dimmable LED lighting circuit comprising such a driver, and a plurality of LEDs in series arrangement with the constant current source.

The circuit may comprise a transformer for receiving an output from a phase-cut dimmer and configured to provide an input power to the power converter at for instance 12V RMS. The circuit may be compliant with lamps such as are defined under standards such as MR16 GU5.3.

According to a yet further aspect there is provided a method of controlling a dimmable LED lighting circuit operable with a phase-cut dimmer and having a power converter for providing power to a series arrangement of a plurality of LEDs and controllable constant current source, the controllable constant current source being for providing a current through the plurality of LEDs, the method comprising: setting the current of the constant current source in dependence on a conduction angle of the phase-cut dimmer; controlling the power converter in dependence on the constant current source by adjusting an output power of the power converter and controlling a supplementary output load arranged in parallel with the series arrangement of the constant current source and plurality of LEDs, wherein adjusting the supplementary output load is faster than adjusting the output of the power convertor.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

Figure 1:
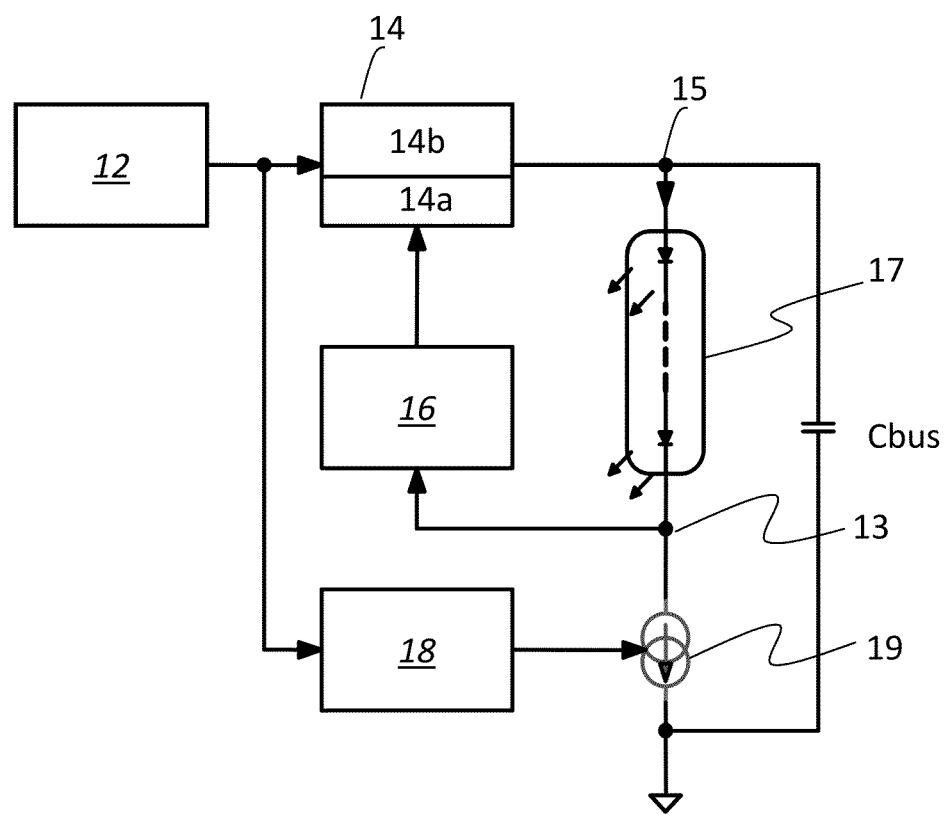
FIG. 1 shows a schematic of an LED lighting circuit having an LED driver system with true current source.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

FIG. 1 shows a schematic of an LED lighting circuit having an LED driver system with true current source. This is known circuit has a phase cut dimmer 12, which may be either a leading-edge phase cut dimmer or a trailing edge phase cut dimmer. The output from the phase cut dimmer is input to a power converter 14. Power converter 14 has a control part 14a and power and related components 14b. Power converter 14 is normally a switched mode power converter. Typically the power converter 14 operates in a constant current mode, to provide a predetermined current at its output, that is to say, node 15. The current is used to charge an output or bus capacitor Cbus, and supply the load. As shown, the load is a string or plurality of LEDs 17 connected, in a series arrangement with a current source 19, between node 15 and ground. A node 13 is depicted between the current source 19 and the LEDs and 17 The bus capacitor Cbus connected in parallel with the LEDs and current source may provide some smoothing. Current source 19 is controlled by means of an LED current control 18. LED current controller 18 is connected to the output of the phase-cut dimmer, and determines the current through the current source 19 independence on the output. A feedback circuit 16 is configured as a feedback circuit, or feedback loop, between the node 13 and the power converter 14.

To minimise heat dissipation and power loss in the current source 18, the voltage at node 13 is set to a low level. This leaves little time for the control system (comprising the controller for the power converter, the feedback circuit 16, and the LED current controller 18) to adjust system parameters, in case of any disturbance, to ensure that the current source always has a sufficient operating margin to provide the desired current.

In the known arrangement according to FIG. 1, the output voltage, that is to say the voltage at node 15, is controlled by the feedback circuit 16. Since the input signal is derived from the mains, it typically has a frequency of 2×50 Hz, or 2×60 Hz. The feedback circuit bandwidth is thus limited to a few tens of hertz, so as to ensure system stability. This is not fast enough to always maintain the current source output voltage within a desired range of only some hundreds of millivolts, so as to avoid its saturation. Moreover, the feedback circuit 16, may result in a change in the input current to the power converter 14 this in turn may impact or change the behaviour of the dimmer 12, and, or in the alternative, may affect the output of the power converter thereby changing the brightness of the LEDs, either in the so the dimmer position has not been altered.

The problem is particularly acute at very low dimmer conduction angles, although is not limited thereto. The problem may be alleviated by the inclusion of a capacitance at the output of the power converter Cbus. The larger the capacitance, the greater the smoothing effect; however, the volume constraints in the lamp, typically results in a limitation of the smoothing capacitor to no more than 500 µF. Moreover, such as smoothing capacitor adds to the cost of the system, the cost increasing with the capacitance value.

It should be noted, that although the input signal is generally derived from the mains, there may be a low voltage or step-down transformer between the mains supply and the input to the circuits shown in FIG. 1 (and other figures).

Figure 2:
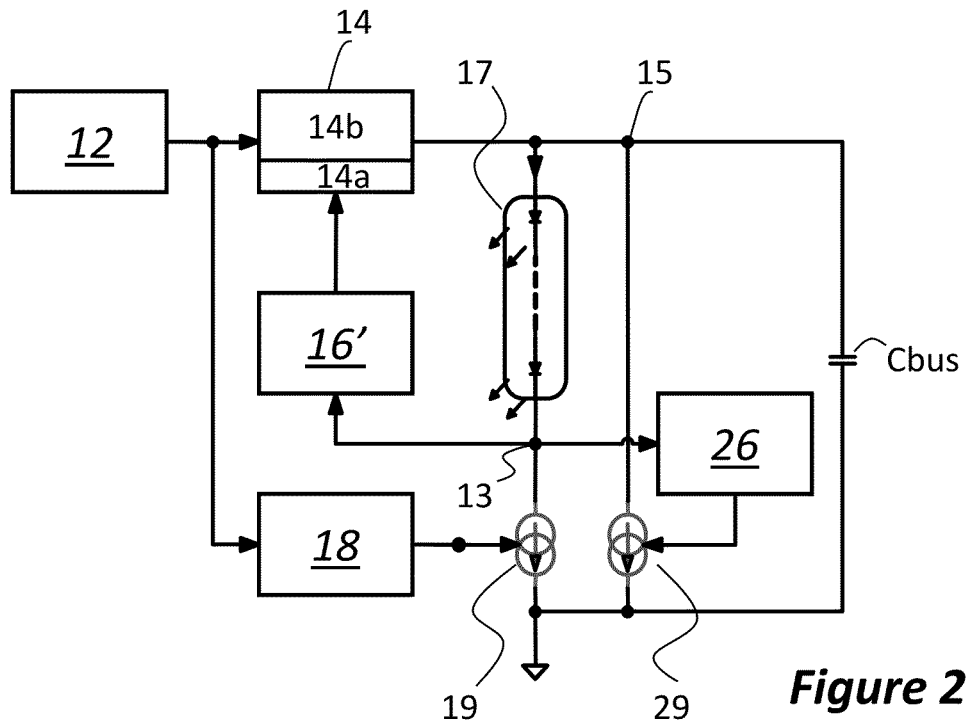
FIG. 2 shows a schematic of an LED lighting circuit according to embodiments.

FIG. 2 shows a schematic of an LED lighting circuit according to embodiments. This lighting circuit is similar to that shown in FIG. 1. However, the circuit is modified by the inclusion of a supplementary load connected in parallel with the series arrangement of the LEDs 15 and current source 13. The magnitude of this supplementary load is controllable by means of a second feedback circuit 26. In the arrangement shown in FIG. 2, the supplementary load is a controllable current source 29. The skilled person would appreciate that since the controllable current source 29 is acting as an additional load which consumes or sinks power rather than the sources power, it could be also be described as a controllable current sink.

The supplementary output load absorbs transient variations in power; such transients arise due to the slow reaction of the first feedback circuit 16' associated with the power converter. Since variations in the output voltage at node 15 are absorbed by the controllable current source 29, the smoothing capacitor Cbus may be replaced by a smaller value capacitor C'bus. In order that the controllable current source can properly absorb variations in the output voltage, it is preferred that the speed of the second feedback circuit 26 should be equal or higher than the speed of the first feedback circuit 16'. It will be noted that there is no requirement that the second feedback circuit 26 does not need to be faster the first feedback circuit 16', since the combination of two similar speed feedback circuits results generally in a ×2 faster overall feedback circuit. It will be appreciated benefit of the second feedback loop is reduced if its reaction time is significantly slower than that of the first feedback circuit 16'. It will also be appreciated that the second loop may also provide a finer resolution than that of the loop associated with the power converter; the latter is generally constrained by power efficiency optimization. Finer resolution typically increases the stability of the controlled point.

Figure 3:
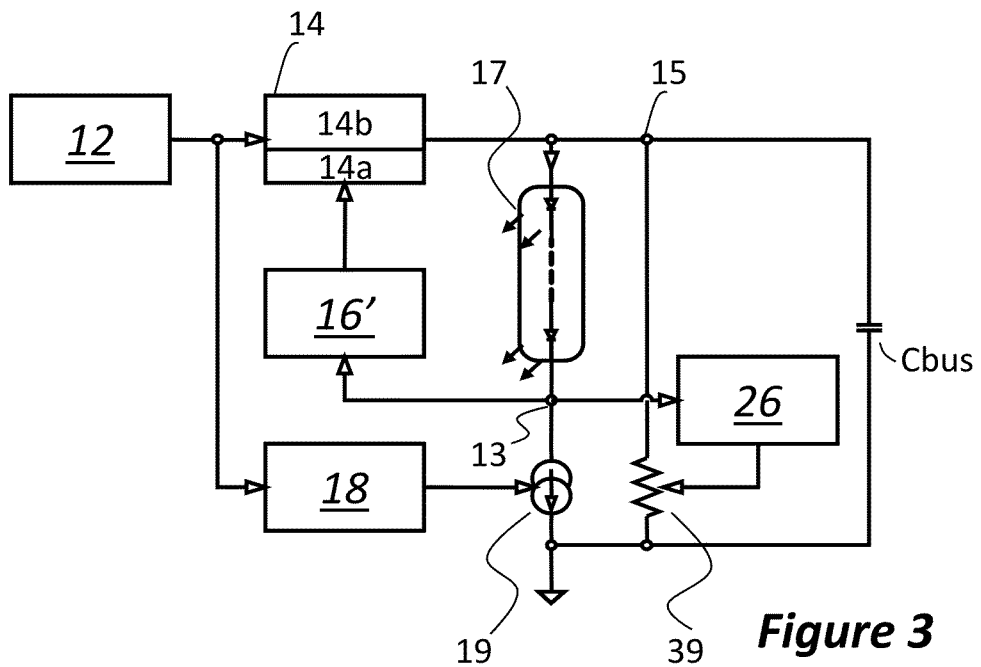
FIG. 3 shows a schematic of an LED lighting circuit according to other embodiments.

FIG. 3 shows a schematic of an LED lighting circuit according to other embodiments. This circuit is generally similar to that shown in FIG. 2, except that in this case the supplementary load is provided by a controllable resistor 39, instead of controllable current source 29. Controllable resistor 39 is controlled by means secondary feedback circuit 26.

The supplementary load consumes power, and thus has an impact on the overall efficiency. In order to minimise the impact of the supplementary load, the steady-state value should be properly selected. In steady-state, the supplementary load value must be set as low as possible whilst still correctly regulating the output voltage. The optimum steady-state value has been found to depend on the dimmer conduction angle, as will now be described.

Figure 4:
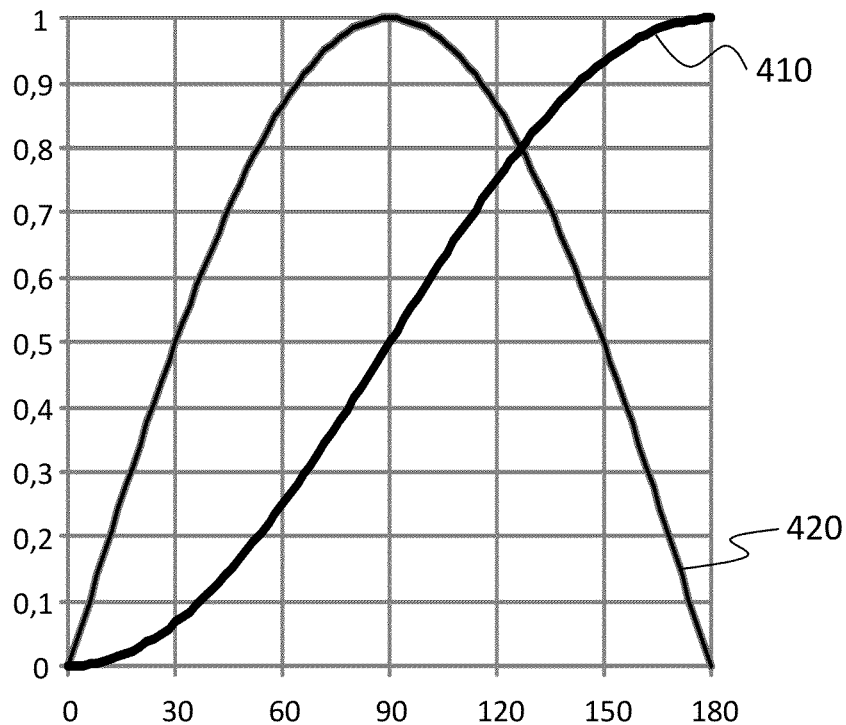
FIG. 4 shows, the normalized power as a function of conduction angle for a constant current and sine wave voltage.

In order to find the optimum setting, one must consider the power variation amplitude in the case of dimmer conduction angle variation. FIG. 4 shows, at 410, the normalized power as a function of conduction angle on the abcissa or x-axis for a constant current and sine wave voltage (mains waveform). The normalized power 410 is the integral of the voltage, shown at 420 in case the current is constant. If CA is the conduction angle in degrees, then the voltage (V) and power Pnorm can be expressed as:

$$V(CA) = \sin\left(\frac{\pi * CA}{180}\right) \quad (1)$$

$$\text{And } Pnorm(CA) = \int_0^{CA} V(x)\,dx = \frac{1}{2}(1 - \cos(CA)) \quad (2)$$

$$\text{So: } \frac{d\,Pnorm(CA)}{d\,CA} = V(CA) \quad (3)$$

Figure 5:
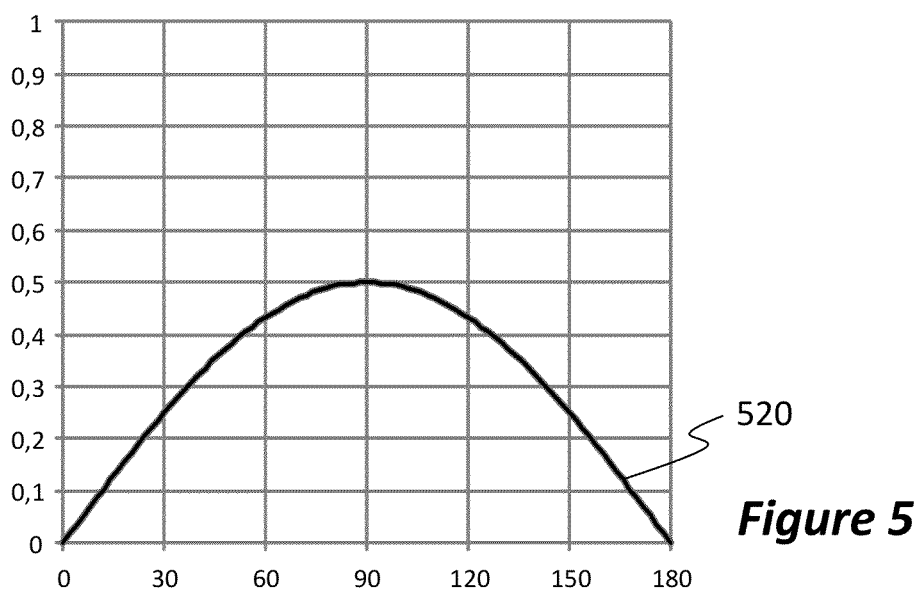
FIG. 5 shows the optimum normalized steady state supplementary output load against conduction angle.

The steady state output load value should thus, ideally, follow the derivate of the power: the higher the derivate, the higher the output load steady state value. Another of describing the steady state value is that is represents the amount of power buffer. If the power variation is fast then we should have a high amount of power buffer to cope with this variation. The optimum steady state supplementary output load is half of the maximum supplementary output load value. FIG. 5 shows, at 510, the optimum normalized steady state supplementary output load, against conduction angle on the abscissa or x-axis. In case the supplementary output load is made with resistance then the optimum steady state resistance is the inverse (1/x) of the value in FIG. 5. (i.e at 90° the optimum value is $2*R_{LOAD}$, $R_{LOAD}$ being the minimum value of the controllable resistance).

The actual setting may differ from the optimum setting as shown in FIG. 5. without necessary affecting the performance. The peak value and shape can be adapted in the specific embodiments to balance performance and power efficiency and easiness of implementation. In particular, since it may not be possible to follow the inverse of the sine, that is to say, the secant of the ankle across the complete conduction angle, particularly at extremely low extremely high conduction angles, it may be appropriate to follow this for a part—for instance 170%—of the conduction angle.

As the output load is controlled by a feedback loop, it is generally not possible to force a predefined steady state value at any arbitrary time, otherwise the feedback loop would not operate correctly. In particular, if the dimmer conduction angle is changing then the feedback loop should be able to operate freely to absorb any power variation. Once the conduction angle is stable, then the system can slowly force the output load value towards the desired steady state value as a function of the dimmer conduction angle. It will be appreciated that the latter information is known at any time to the system such that the LED current can be changed accordingly. Changing the output load value will lead to a change in the output voltage at the current source. The power converter feedback loop will react accordingly by adjusting the level of transferred power.

Figure 6:
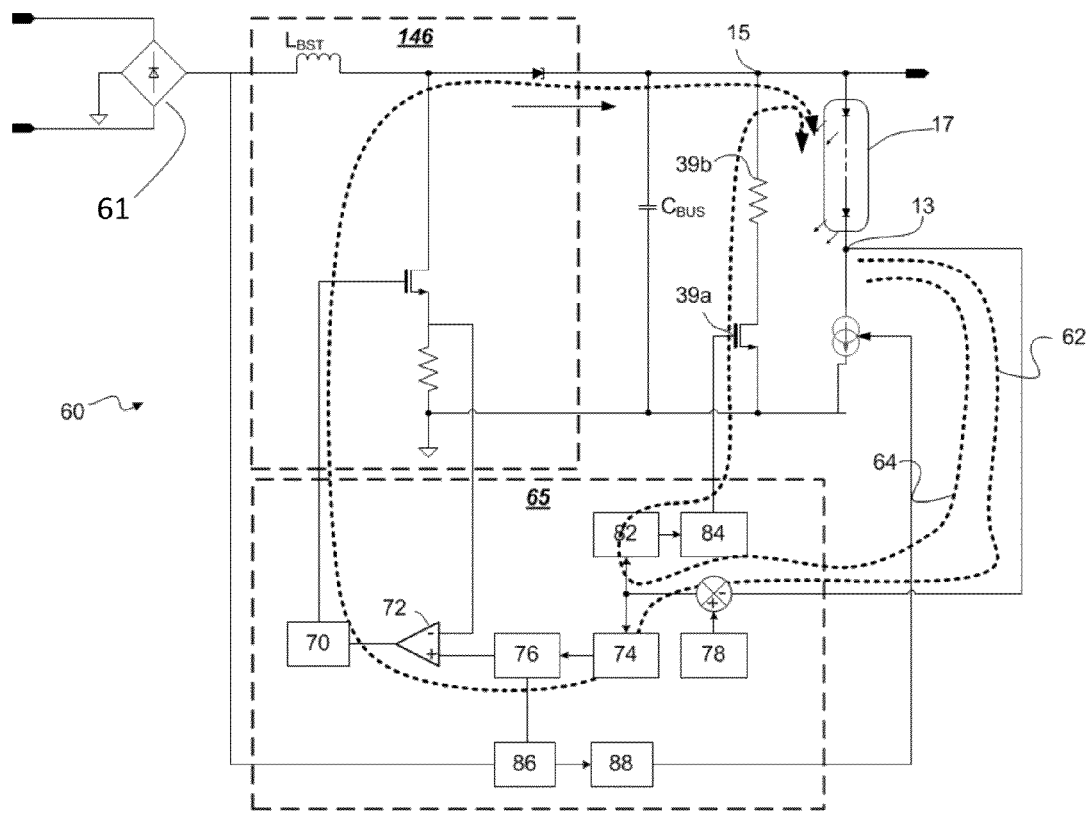
FIG. 6 is a schematic of a lighting circuit showing in block form the functionality of a driver according to embodiments.

FIG. 6 is a schematic of a lighting circuit showing, in block form, the functionality of a driver according to embodiments. The circuit includes an AC input, which may be from a phase cut dimmer or low voltage transformer as described above, and which is rectified by rectifier 61. The power converter 14b is connected to the input signal, and provides output power in the form of an ouptut current to node 15. This output current charges the bus capacitor Cbus, drives the series arrangement of the string of LEDs 17 and current source 19, and drives the additional load comprising controllable resistance 39.

The control functions are shown in LED driver 65, which may be provided as a single driver IC, and incorporates the functionality of first feedback circuit 16', second feedback circuit 26, together with LED current control 18, and is the power controller control functionality 14a, discussed above with regards to FIG. 3.

LED current control 18 functionality is provided by extracting, at 86, the duty cycle of a phase cut dimmer, if present, and to control of the current source 19 through pulse width modulator (PWM) 88. Digital signal processing (not shown in this block diagram) may be applied to the extracted duty cycle value determined at 86, in order to determine a setpoint 78 for the LEDs.

LED driver 65 comprises a MOSFET driver 70, which switches the power switch in the power converter 14b, according to the output of a comparator 72. The comparator 72 compares the voltage at the low side of the power switch of power converter 14b, with a control signal. The control signal is provided by a digital PI controller (proportional/integrating controller) 74, the output of which is converted to an analog signal by digital to analog converter 76. The input to the PI controller is provided from a difference, at 80, between the predetermined setpoint 78 and the voltage at the node 13 as described above. This feedback circuit is defined which implements a feedback loop shown at 62 in FIG. 6.

The LED driver 65 also comprises a second feedback circuit, generally following feedback loop shown in FIG. 6 as 64: the difference between the setpoint and voltage from node 13 is input to a second PI controller 82. The output from this PI controller 82 is directed to a pulse width modulator (PWM) 84. The pulse width modulator signal controls the modulation speed of a switch 39*a*. Which, in combination with predetermined resistance 39*b*, comprises the controllable resistance 39.

By way of clarification, it will be appreciated, that as used herein, that the current source 19 is used to maintain a constant LED brightness, and thus may be referred to as a "constant current source", However, over an individual mains half-cycle, the voltage at the ouput of the current source may have a significant level of ripple. Since the current source may not have very high output impedance, the current can vary, typically, as much as 15%. Since this frequency of this variation, at twice the frequency of the mains, is outside of the visible range, it is generally acceptable. In order to be clear that, on this timeframe, the current may vary. The current source is referred to as a "current source" herein, rather than a "constant current source". Moreover, for the avoidance of doubt it is confirmed that the value of the current source in series with the LEDs is determined in dependence on the conduction angle of the dimmer; when the dimmer is adjusted to a new conduction value, the current source is adjusted to provide a new and potentially different "constant" current to that previously provided.

Figure 7:
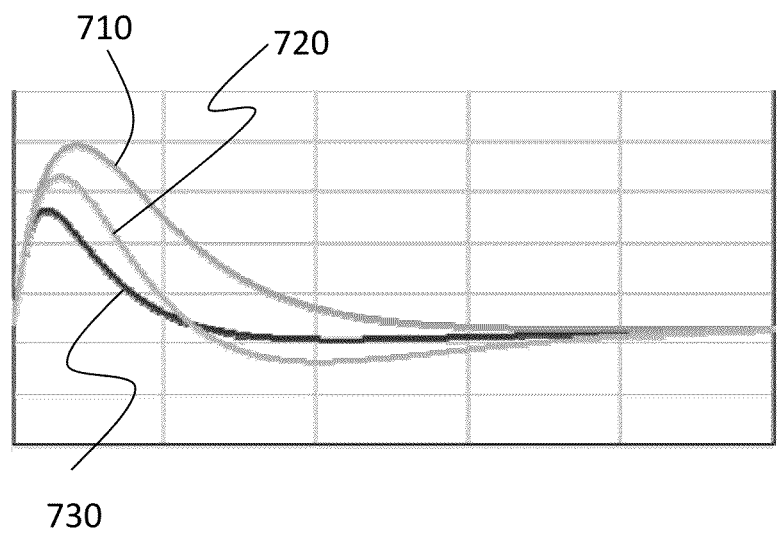
FIG. 7 illustrates shows the response time of a circuit to a perturbation according to embodiments.

FIG. 7 illustrates shows the response time of a circuit to a perturbation according to embodiments. The figure shows, on the y-axis or ordinate, the voltage at node 13 plotted against time on the x-axis or abscissa. The response of the circuit in FIG. 1, having only the first feedback circuit 16, is shown at 710. The response of a circuit having a second feedback circuit 26—but with the first feedback circuit disabled or disconnected—is shown at 720. The response of a circuit having both feedback circuits 16' and 26, is shown at 730.

The time constant of the feedback circuit may be defined as the time that the circuit takes to return substantially to its original state, following a disturbance. "Substantially return" may mean, herein, returning to within ±0.1V of the original value. In other embodiments, substantially return" may mean, returning to within ±0.25V of the original value. In still other embodiments, "substantially return" may mean reducing the perturbation to less than 10% of its original value.

It can be seen that the second feedback circuit operates with a similar time constant, to the first feedback circuit, However, as shown at 730, by implementing both the first feedback circuit and the second feedback circuit, either or both of two improvements may be obtained: firstly, the maximum perturbation is reduced. And secondly, the time constant of the circuit is significantly reduced, with respect to the circuit having only the first feedback circuit.

In a particular embodiment, operating with a 50 Hz mains input, the gradations on the x-axis may correspond to 200 ms; as shown, in this embodiment, the first feedback circuit may have a response time (to return the voltage at node 13 to within 0.25 of its pre-perturbation value) of approximately 425 ms, the second feedback circuit a response time of approximately 250 ms, and when operated together, the response time of the total circuit may also be 250 ms. However, the time to return to within 0.1V of the pre-perturbation value is, with only the first feedback circuit, approximately 650 ms, with only the second feedback circuit, approximately 500 ms, but with both feedback circuits operating, approximately 250 ms—which represents an improvement by a factor of 2 over the first feedback circuit response time or time constant.

From reading the present disclosure, other variations and modifications will be apparent to the skilled person. Such variations and modifications may involve equivalent and other features which are already known in the art of LED lighting controllers, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A controller for a dimmable LED lighting circuit operable with a phase-cut dimmer and having a power converter for providing power to a series arrangement of a plurality of LEDs and a controllable current source, the controllable current source being for providing a current through the plurality of LEDs, the controller comprising:
an LED current controller configured to set the current of the current source in dependence on a conduction angle of the phase-cut dimmer;
a first feedback circuit configured to control the power converter in dependence on the current source by adjusting an output power of the power converter; and
a second feedback circuit configured to control a supplementary output load arranged in parallel with the series arrangement of the current source and plurality of LEDs.

2. A controller according to claim 1, wherein the second feedback circuit is configured to adjust the supplementary output load with a time constant which is shorter than a response time of the first feedback circuit.

3. A controller according to claim 1, wherein the first feedback circuit has an input, the input being in communication, in use, with a node between the current source and the plurality of LEDs.

4. A controller according to claim 1, wherein the second feedback circuit has an input, the input being in communication, in use, with a node between the current source and the plurality of LEDs.

5. A controller according to claim 1, configured for use with a supplementary output load which comprises a controllable resistance.

6. A controller according to claim 5, wherein the second feedback circuit is configured to set the controllable resistance, in a steady state, to a value which varies in proportion to the secant of the conduction angle of the phase-cut dimmer, over at least 170° of conduction angle.

7. A controller according to claim 1, configured for use with a supplementary output load which comprises a controllable current source.

8. A driver for a dimmable LED lighting circuit and comprising a controller as claimed in claim 1, a current source for providing a current through the plurality of LEDs, a power converter in communication with and for being controlled by the first feedback circuit, and a supplementary output load in communication with and for being controlled by the second feedback circuit.

9. A dimmable LED lighting circuit comprising a driver as claimed in claim 8, and a plurality of LEDs in series arrangement with the current source.

10. A method of controlling a dimmable LED lighting circuit operable with a phase-cut dimmer and having a power converter for providing power to a series arrangement of a plurality of LEDs and controllable current source, the controllable current source being for providing a current through the plurality of LEDs,
the method comprising:
setting the current of the current source in dependence on a conduction angle of the phase-cut dimmer;
controlling the power converter in dependence on the current source by adjusting an output power of the power converter and
controlling a supplementary output load arranged in parallel with the series arrangement of the current source and plurality of LEDs,
wherein adjusting the supplementary output load is faster than adjusting the output of the power convertor.

* * * * *